Patented Jan. 28, 1930

1,745,028

UNITED STATES PATENT OFFICE

ELOI RICARD, OF MELLE, FRANCE, ASSIGNOR TO SOCIETE RICARD, ALLENET & CIE., OF MELLE, DEUX-SEVRES, FRANCE

PROCESS OF CONVERTING GASEOUS ALIPHATIC ETHYLENE HYDROCARBONS INTO LIQUID HYDROCARBONS

No Drawing. Application filed July 24, 1923, Serial No. 653,564, and in Belgium August 9, 1922.

It is well known that the aliphatic ethylene hydrocarbons are capable of condensing as polymeric substances whose formula is double, triple and even quadruple the original formula. This polymerization is effected in the presence of catalysts such as sulphuric acid, this being the most frequently mentioned. Chloride of zinc, fluoride of boron, chloride of aluminium and ferric chloride will sometimes act. It is necessary to operate under very different conditions according to the hydrocarbon and the catalyst used. In particular, anhydrous aluminium chloride has been employed by Weizmann and Legg for the purpose of effecting the polymerization of the butylene which is obtained from butylic alcohol (British Patent 165,452 of March 7, 1916). They treat liquefied butylene with anhydrous chloride of aluminium at a temperature below −10 degrees C. This gives a quantitative conversion into hydrocarbons having high boiling points, but in fact this polymerization is extremely slow. Even when operating in a digester, at ordinary temperature, the reaction is hardly susceptible of use in manufacturing practice.

I have ascertained on the contrary that anhydrous chloride of aluminium placed in suspension in petroleum ether constitutes a catalyst having a considerable activity, being capable of readily condensing not only the butylenes and amylenes, but also their lower homologues propylene and ethylene.

This point is particularly important, since in fact ethylene is by far the most interesting of all these hydrocarbons. One may obtain it by a de-hydration of ordinary alcohol by catalysis, or by extracting it from gas produced in certain pyrogenic operations (cracking, illuminating gas, coke oven gas etc.).

The operating method consists in circulating the gaseous hydrocarbon at ordinary pressure and temperature through petroleum ether containing anhydrous chloride of aluminium in suspension. The hydrocarbon is absorbed, and it is fixed in part upon the aluminium chloride which is thus converted into a brown viscous liquid having a tendency to adhere to the sides of the vessel; when this conversion has taken place, the absorption of the hydrocarbon becomes still more easy, and hence it might be supposed that the active catalyst is a complex substance formed by the combination of aluminium chloride and ethylene hydrocarbon.

However this may be, it is feasible with a small quantity of aluminium choloride to condense a considerable volume of ethylene hydrocarbon. This amount will however be diminished if the hydrocarbon is not in the pure state or is not well de-hydrated.

When ethylene and propylene are employed, although the reaction is readily carried out at the ordinary temperature and pressure, it is advantageous to augment these two factors to a certain extent so as to increase the rate of absorption.

At all events, when the operation is completed, it is necessary to stir up the resulting liquid with water so as to destroy the complex aluminium compound which it contains; rectification can then be performed or not according to circumstances.

Ethylene hydrocarbons in the concentrated or diluted state can be treated in inert gases, separately or mixed, or they may be made to alternate, thus affording certain advantages.

Thus one may in the first place make use of butylene in order to produce very rapidly the complex aluminium catalyst, then causing the absorption of the ethylene or propylene.

The liquid hydrocarbons thus obtained consist of complex mixtures of polymeric substances; they have no determined boiling point; they contain a double bond whereby they are capable of producing interesting chemical reactions. In particular, they may be hydrogenated by the standard methods in the presence of the known catalyzers. They may also be subjected to the operation known as cracking in order to obtain products having a lower boiling point which can be used as fuel in internal combustion engines.

*Example I*

In a receptacle which is provided with a condenser of the reflux type, and having a capacity of about 500 litres, I place 100 kilogrammes of petroleum ether holding in suspension 20 kilogrammes of powdered anhydrous chloride of aluminium.

I circulate in this mixture, which is preferably stirred, a rapid current of butylene; the gas is absorbed, and the chloride of aluminium becomes gradually converted into a brown viscous liquid. I then increase the velocity of the current of gas, and since the reaction produces heat, the liquid commences to boil. It is then cooled, should this be required.

The volume of the liquid gradually increases, and after a few hours of the circulation, the receptacle becomes entirely filled. The rate of absorption continues to be high.

When the receptacle is filled, a certain quantity of the clear liquid may be drawn off, or by treating the mass with water the petroleum products obtained may be separated therefrom, and the operation may be continued in the manner set forth above.

The liquid after washing and drying is rectified so as to separate the first-distilled products constituting the petroleum ether which served as the diluting substance. One thus obtains a liquid of a limpid and an oily nature and of a light yellow color, having a weak characteristic odor.

The brown viscous substance which adheres to the sides and bottom of the receptacle is decomposed by water with a violent reaction, producing an oily layer which possesses a fine blue fluorescence and having an appearance and odor which may be compared to those of crude petroleum.

*Example II*

In an enamelled digester of 500 litres capacity and provided with a worm tube constituting a cooling device on the reflux principle, I dispose 100 kilograms of gasoline and 20 kilograms of powdered chloride of aluminium. Compressed ethylene is circulated through the same, stirring all the while; the operation is carried out while maintaining the pressure at 3 kilograms per square centimeter.

The ethylene is absorbed, and the volume of the liquid becomes gradually increased. When the digester is filled, the liquid is treated with water, or otherwise a certain amount of liquid is drawn off and the operation is continued as in the preceding example.

Obviously, the process hereinbefore described is susceptible of various modifications without departing from the spirit of the invention.

The product of the process herein set forth is claimed in divisional application filed February 13, 1925, Ser. No. 9,034.

What I claim is:—

1. A process for the conversion of gaseous ethylenic hydrocarbons of the olefinic series into liquid hydrocarbons by the condensation of gaseous ethylenic hydrocarbons, preliminarily purified, by means of anhydrous aluminium chloride in suspension in a petroleum derivative.

2. A process for the conversion of gaseous ethylenic hydrocarbons of the olefinic series into liquid hydrocarbons by the condensation of gaseous ethylenic hydrocarbons, preliminarily purified, by means of anhydrous aluminium chloride in suspension in gasoline.

3. A process for the conversion of gaseous ethylenic hydrocarbons of the olefinic series into liquid hydrocarbons by the condensation of the said gaseous hydrocarbons which have been preliminarily purified, consisting in circulating the gaseous ethylenic hydrocarbon in a suitable receptacle in proximity to a cooling agent, said receptacle containing gasoline having anhydrous aluminium chloride in suspension, in decanting the liquid which has increased in volume from the said receptacle, and in rectifying the same in order to obtain the liquid ethylenic hydrocarbon.

4. A process for the conversion of ethylene into liquid hydrocarbons by the condensation of purified ethylene, consisting in circulating the gaseous ethylene in a suitable receptacle in proximity to a cooling agent, said receptacle containing gasoline having anhydrous aluminium chloride in suspension, and having therein a pressure above atmospheric pressure, in withdrawing the liquid, which has increased in volume, from the said receptacle, and in rectifying the same in order to obtain the liquid ethylenic hydrocarbon.

5. A process for the conversion of gaseous ethylenic hydrocarbons of the olefinic series into liquid hydrocarbons by the condensation of the said gaseous hydrocarbons which are preliminarily purified, consisting in circulating the gaseous ethylenic hydrocarbon in a receptacle in proximity to a cooling agent, said receptacle containing gasoline having anhydrous aluminium chloride in suspension, in withdrawing the liquid, which has increased in volume, from the said receptacle, in scrubbing and dehydrating the same, and in rectifying the said liquid in order to obtain the liquid ethylenic hydrocarbon.

In testimony whereof I have signed this specification.

ELOI RICARD. [L. S.]